July 31, 1945.  H. H. BOUND  2,380,497
BICYCLE FRAME
Filed Feb. 10, 1943

INVENTOR.
HARRY H. BOUND
BY
Oberlin, Limbach + Day.
ATTORNEYS

Patented July 31, 1945

2,380,497

UNITED STATES PATENT OFFICE 2,380,497

BICYCLE FRAME

Harry H. Bound, Lakewood, Ohio, assignor to The Cleveland Welding Company, Cleveland, Ohio, a corporation of Ohio Application February 10, 1943, Serial No. 475,358

1 Claim. (Cl. 287—54)

This invention relates as indicated to bicycle frames and more especially to a novel means for effecting a connection between several of the components of the frame, whereby a rigid and extremely strong structure may be produced.

My invention is particularly suitable in use with connection of bicycle frames fabricated from tubular members lighter than those customarily employed. When the rather heavy wall tubing of prior conventional practice is employed, the several elements of the frame, such as for example those which converge at the point where the rear seat is mounted on the frame, may usually be inter-connected by welding the members to each other. The thickness of wall of the tubing from which the several components are made permits this practice which however results in a structure which is perhaps one of the weakest points in the entire assembly.

Now when a lighter frame is to be fabricated as by the use of much thinner walled tubing, the amount of stock available at the ends of the tubes themselves is not sufficient to make possible a rigid connection therebetween of sufficient strength unless some additional means is provided at the point of connection.

It is a principal object of the present invention to provide a bicycle frame which may be fabricated of light stock but which at the point of connection of the several members at the place where the seat is mounted thereon is not only extremely rigid and strong, but also capable of economical fabrication. Other objects of the invention will appear as the description proceeds.

To the accomplishment of the foregoing and related ends, the invention, then, comprises the features hereinafter fully described, and particularly pointed out in the claim, the following description and the annexed drawing setting forth in detail certain illustrative embodiments of the invention, these being indicative however, of but a few of the various ways in which the principle of the invention may be employed.

In said annexed drawing—

Figure 1:
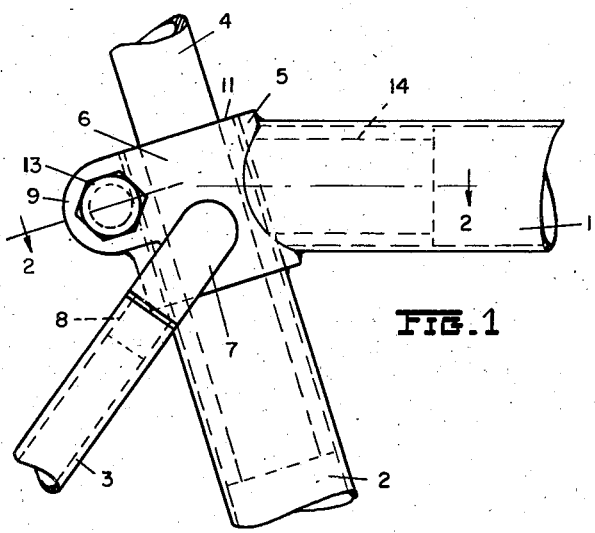
Figure 2:
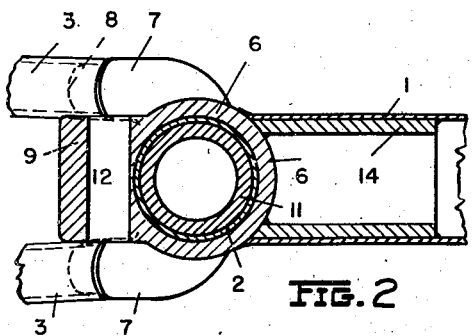
Figure 3:
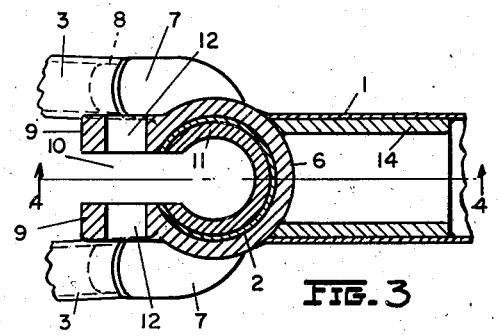
Figure 4:
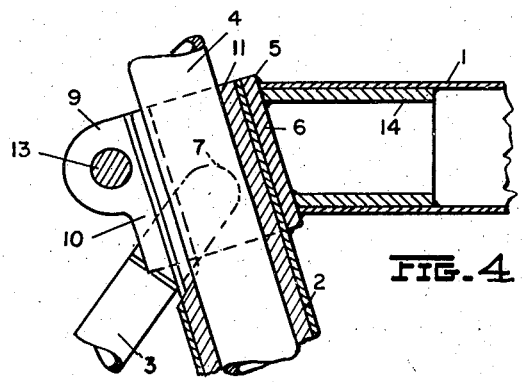

Fig. 1 is a fragmentary side elevational view of a portion of a bicycle frame constructed in accordance with the principles of my invention; Fig. 2 is a transverse sectional view of the structure illustrated in Fig. 1, taken on a plane substantially indicated by the lines 2—2, showing however the assemblage in an intermediate stage of its manufacture; Fig. 3 is a view similar to Fig. 2 showing the structure in its completed state of manufacture; and Fig. 4 is a transverse sectional view of the structure illustrated in the previous figures taken on a plane substantially indicated by the line 4—4, in Fig. 3.

Referring now more particularly to the drawing and more especially to Fig. 1, my invention is primarily concerned with that portion of the bicycle frame on which the seat post is mounted. The elements of the frame which converge at this point are the top rail 1, the seat mast 2, and a pair of tubular rear fork members 3. The bicycle seat is carried by a tubular stem 4, only the lower end of which is shown.

In accordance with my invention, the several components of the frame in the area indicated are inter-connected by means of a unitary connection 5 which in the preferred embodiment of my invention is a malleable iron casting and the form of which is clearly evident from the several figures. The unitary member 5 comprises a main cylindrical body 6, the inside diameter of which as formed is such as to have close telescopic engagement with the upper end of the seat mast 2. The cylindrical body 6 has a pair of unitary bracket extensions or arms 7 formed integrally therewith and so arranged as to project along the line of the axes of the rear fork members respectively. The terminal portions of the arms 7 are of a reduced diameter as at 8, in order to have telescopic engagement with the upper ends of the rear fork members 3. This reduced diameter also provides a shoulder stop against which the ends of the rear fork members seat and thus not only strengthening the structure but also facilitating assembly of the parts.

The tubular body 6 has a pair of spaced lugs 9 formed integrally therewith, and when the unitary member 5 is formed as a casting it will be convenient to have the cylindrical body thereof as shown in Fig. 2, substantially continuous in the area between the spaced projections 9. After the parts have all been assembled in the manner illustrated in Fig. 2, then the cylindrical body 6 and the projections 9 will have a relatively wide saw slot, as indicated at 10, formed therein, such saw slot extending entirely through the cylindrical body as well as the seat mast 2 and the reinforcing thimble 11 on the inside of the latter. Openings 12 in the projections 9 accommodate a bolt 13 by which the thus split assemblage may be drawn together to firmly grip the shaft 4 which supports the seat.

The various component parts of the assemblage may be united onto the connection member 5 in the following manner. The tubular fork members 3 merely telescopically engage the end of the reduced arms 7. A thimble 11 is inserted in the upper end of the seat mast 2 and extends axially thereof toward the sprocket area for a distance approximately equal to twice the axial extent of the cylindrical body 6. All of these parts have their contacting faces coated with a brazing material and after assemblage the parts are then heated by means of a torch applied only to the local areas to be united, these then become heated sufficiently to melt the brazing material, whereupon a molecular bond will be established between all of the parts.

The substantial diameter of the cylindrical body 6 coupled with its rigid character, makes possible the connection thereto of the top rail 1 by a butt connection. This is accomplished by first inserting a thimble 14 into the end of the top rail 1 and then milling the end of the top rail assembly so that it will closely embrace the outer periphery of the cylindrical body 6 in the manner illustrated. These contacting faces are also coated with brazing material and will be united simultaneously with the brazing operation previously referred to and which is relied upon for the purpose of making a molecular bond between all of the parts.

The saw slot 10 is formed in the assembly as the last operation and it need extend axially downwardly of the mast 2 only slightly below the lower edge of the cylindrical body 6. The inside diameter of the thimble 11 is such as to normally closely embrace the outer periphery of the seat shaft 4 so that only a very slight amount of flexing of the assembly under the influence of the tightening bolt 13 is necessary in order to grasp the seat shaft 4 sufficiently strongly to hold the same in position.

From the foregoing it will be observed that I have provided an extremely rigid and strong connection between the several elements of the bicycle frame in the area where it is subjected to the greatest load, i. e. directly underneath the seat. By the use of this unitary assembly member, very thin walled tubing may be used for the body of the bicycle. The form and shape of the unitary member 5 are such that the parts require little attention in the assembling operation. The telescopic engagement between the members not only insures a very rigid ultimate connection, but also dispenses with the use of jigs in the normal assembling operation. While a projection might be cast onto the cylindrical body 6 which would have telescopic engagement with the upper rail 1 similar to the manner in which the arms 7 have telescopic engagement with the rear fork members 3, this is usually not necessary since the type of connection above described between the top rail and the cylindrical body is of sufficient strength.

While a malleable iron casting has been indicated as the preferred embodiment of the unitary connection member 5, it is nevertheless possible to utilize under certain conditions either a stamping or a forging so long as the ultimate structure retains the characterizing features above pointed out.

Other modes of applying the principle of the invention may be employed, change being made as regards the details described, provided the features stated in the following claim, or the equivalent of such, be employed.

I therefore particularly point out and distinctly claim as my invention:

In a bicycle frame, the combination with a pair of tubular rear fork members, a tubular rear-seat mast, and a tubular top rail, of a unitary connection member secured to the end of said top rail and in telescopic engagement with said seat mast and rear fork members, a molecular bond between all of said components, said connection member and contiguous portion of the seat mast being bifurcated throughout at least a portion of their length, projections adjacent said bifurcation and a bolt to flex such connection member and cause the assembly to grip a seat post therein.

HARRY H. BOUND.